United States Patent
Kita et al.

(10) Patent No.: US 7,593,568 B2
(45) Date of Patent: Sep. 22, 2009

(54) METHOD OF DETECTING THE BASE CONCENTRATION OF A PHOTOGRAPHIC FILM

(75) Inventors: Koji Kita, Naga-gun (JP); Kazumi Watanabe, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 624 days.

(21) Appl. No.: 11/298,516

(22) Filed: Dec. 12, 2005

(65) Prior Publication Data

US 2006/0133668 A1    Jun. 22, 2006

(30) Foreign Application Priority Data

Dec. 17, 2004    (JP)    ............... 2004-365907

(51) Int. Cl.
    *G06K 9/00*    (2006.01)
(52) U.S. Cl. .......................... 382/162; 382/168
(58) Field of Classification Search ................. 382/162, 382/167, 168, 254, 266, 274, 275, 299, 305, 382/312; 345/589
    See application file for complete search history.

(56) References Cited

U.S. PATENT DOCUMENTS

| | | | |
|---|---|---|---|
| 4,719,494 A | 1/1988 | Shiota | |
| 5,596,415 A | 1/1997 | Cosgrove et al. | |
| 5,995,194 A | 11/1999 | Terashita | |
| 6,219,129 B1 * | 4/2001 | Kinjo et al. | 355/40 |
| 6,222,613 B1 * | 4/2001 | Haraguchi et al. | 355/40 |
| 6,235,140 B1 * | 5/2001 | Ishii et al. | 156/230 |
| 6,683,981 B1 * | 1/2004 | Matama | 382/167 |
| 7,099,048 B2 * | 8/2006 | Yamamoto | 358/3.26 |

FOREIGN PATENT DOCUMENTS

| | | |
|---|---|---|
| EP | 0 629 903 A | 12/1994 |
| JP | 10-186541 A | 7/1998 |
| JP | 2004-208064 A | 7/2004 |

* cited by examiner

*Primary Examiner*—Kanji Patel
(74) *Attorney, Agent, or Firm*—Smith Patent Office

(57) ABSTRACT

A method of detecting the base concentration of a film is provided including: a film image entering process of reading a developed film with an image pickup device to generate the pixel values in each of the RGB color components; a non-exposure region detecting step of detecting the edge of each frame on the film from the detected pixel values and specifying as the non-exposure region each line of pixels disposed at the intermediate between any two adjacent frame-image edges from the detected edge data; and a base concentration calculating step of subjecting the pixel values in each non-exposure region specified in the non-exposure region detecting step to different arithmetic operations for calculating corresponding base concentrations of the film, whereby the highest of the base concentrations is judged as a true base concentration.

10 Claims, 8 Drawing Sheets

L1 L2 L3

Non-exposure regions (pixel lines) before correction

Non-exposure regions(pixel lines) after correction

METHOD OF DETECTING THE BASE CONCENTRATION OF A PHOTOGRAPHIC FILM

BACKGROUND OF THE INVENTION

1. Field of the Invention

The present invention relates to a method of detecting a base concentration of a photographic film, such as a negative, which has been read out with a film scanner. More particularly, the present invention relates to a method of detecting a base concentration of a film which includes a film image entering process of reading a developed film with an image pickup device to generate pixel values in each of RGB color components. A non-exposure region detecting step is for detecting the edge of each frame-image on the film from the pixel values and specifying as the non-exposure region each line of pixels disposed at the intermediate between any two adjacent frame-image edges from the detected edge data. A base concentration calculating step is for subjecting the pixel values in each non-exposure region specified in the non-exposure region detecting step based on a given arithmetic operation for calculating the base concentration value of the film.

2. Description of the Related Art

It is necessary for printing images recorded on a negative film onto a photographic printing paper, photosensitive material with a higher level of color quality to correct any unwanted artifacts in the images through concerning the intrinsic characteristics of an input system such as a film scanner as well as of an output system such as a photographic printer. For example, a color image data read out from a developed negative film with the use of a film scanner may generally have an undesired effect of bias due to the input characteristics of the color film scanner. Therefore, the color image data has to be subjected to correction processes including color correction data and concentration correction data only when the color scanner has been adjusted initially in the intensity or wavelength of light emitted from its light source or the shutter speed (a charge accumulating duration) of its image pickup device.

The correction processes are preferable to be carried out with reference to the base concentration of each film which may be varied depending on the manufacturer, the degree of sensitivity, and the film type or due to color fading with time.

For the purpose, Japanese Unexamined Patent Publication No. H10-186541 discloses a conventional method of detecting the base concentration of a film which includes, as shown in FIG. 8A, a film image entering process of reading a developed film with an image pickup device to generate the pixel values in each of the RGB color components, a non-exposure region detecting step of detecting the edge, either at right or left, of each frame-image on the film from the pixel values read in the film image entering process and specifying as the non-exposure region each line of pixels spaced by a given distance from the detected edge of the frame, e.g., the center line at the intermediate between any two adjacent frame-image edges, and a base concentration calculating step of determining the mean value of the concentrations of all the pixels in the non-exposure regions on the full length of the film specified in the non-exposure region detecting step as the base concentration value of the film.

However, the conventional method where the base concentration is determined from the mean value of the pixel concentrations in the non-exposure regions at the center line between any two adjacent frame-image edges fails to judge the base concentration at higher accuracy because the line of pixels as the non-exposure region remains not uniform particularly when the distance between frames is too narrow due to the property of a camera such as shown in FIG. 8B or when two adjacent frames are significantly different from each other in the concentration due to over-scene pictures such as shown in FIG. 8C. As a result, such as the color correction will be declined in the uniformity.

SUMMARY OF THE INVENTION

It is hence an object of the present invention, in view of the foregoing drawback, to provide a method of detecting the base concentration of a film where the base concentration value can be calculated at more accuracy even if the distance between frames is too narrow or any two adjacent frames are significantly different from each other in the concentration due to over-scene pictures.

For achievement of the object, a method of detecting the base concentration of a film according to the present invention is provided including a film image entering process of reading a developed film with an image pickup device to generate the pixel values in each of the RGB color components, a non-exposure region detecting step of detecting the edge of each frame-image on the film from the pixel values generated in the film image entering process and specifying as the non-exposure region each line of pixels disposed at the intermediate between any two adjacent frame-image edges from the detected edge data, and a base concentration calculating step of subjecting the pixel values in each non-exposure region specified in the non-exposure region detecting step to a statistic calculation for calculating the base concentration value of the film, wherein the base concentration calculating step is arranged to subject the pixel values in the non-exposure regions to two or more arithmetic operations for calculating two or more base concentration value and to judge that the highest of the base concentration value is a true base concentration.

The two or more arithmetic operations may preferably be conducted by calculating the mean pixel value in the non-exposure region and its standard deviation $\sigma$ in each of the RGB color components, and determining the mean pixel value within a range $\pm\sigma$ about the mean pixel value as the base concentration value in each of the RGB color components.

The two or more arithmetic operations may preferably be conducted by generating a concentration histogram in each of the RGB color components from the pixel values in the non-exposure region, and determining the mean pixel value in an interval which includes the greatest peak as the base concentration value of the film.

The two or more arithmetic operations may preferably be conducted by calculating the mean pixel value in the non-exposure region and its standard deviation $\sigma$ in each of the RGB color components, and determining the mean pixel value within a range from $-\sigma$ to $\sigma+\sigma^2$ about the mean pixel value as the base concentration in each of the RGB color components.

The two or more arithmetic operations may preferably be conducted by generating a concentration histogram in each of the RGB color components from the pixel values in the non-exposure region, and determining the mean pixel value in an interval, which is determined by the relationship between the greatest peak and a second peak found at the higher side of the greatest peak, as the base concentration value of the film.

The non-exposure region detecting step may preferably be conducted by detecting the edge of each frame on the film from the pixel values read out in the film image entering process, specifying as a provisional non-exposure region a line of pixels located at the intermediate between any two adjacent frame-image edges and calculating the mean pixel value in the provisional non-exposure region, repeating the process of calculating the mean pixel value in each line of pixels while the line of pixels to be examined is shifted by a given distance forward or backward from its original location, and determining the line of pixels of which the mean value is the highest as the true non-exposure region.

As described above, the method of detecting the base concentration of a film according to the present invention allows the base concentration value to be calculated at higher accuracy even when the distance between frames is too narrow or any two adjacent frames are significantly different from each other in the concentration due to over-scene pictures.

Other advantages and features of the present invention will be apparent from the following detailed description.

DETAILED DESCRIPTION OF THE PREFERRED EMBODIMENTS

A method of detecting the base concentration of a film according to the present invention will be described referring to the relevant drawings.

Figure 1:
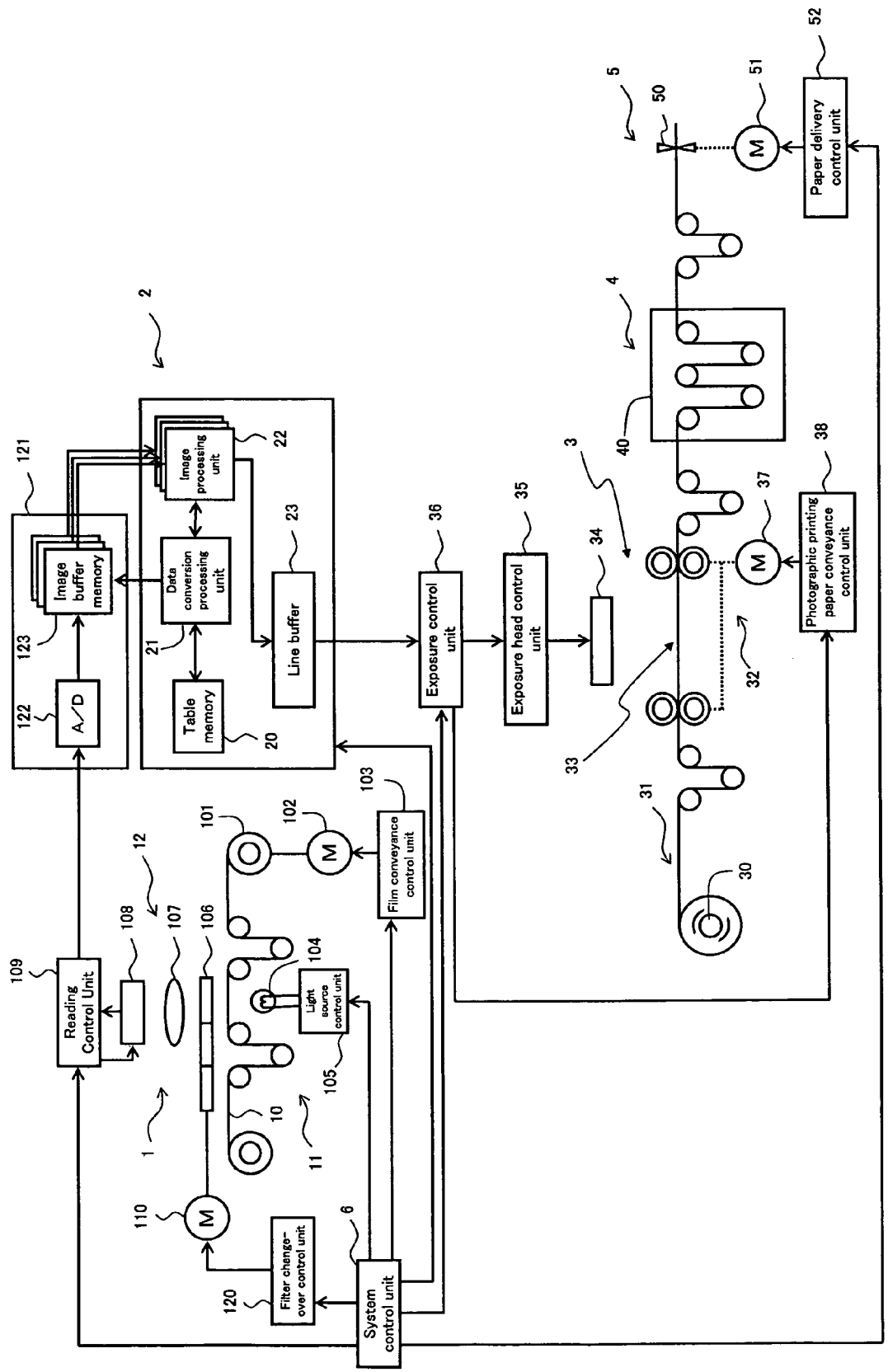
FIG. 1 is a functional block diagram of a photographic processing device to which a method of detecting the base concentration of a film according to the present invention is applied.

The method of detecting the base concentration of a film according to the present invention is implemented by a photographic image processing device which, as shown in FIG. 1, includes a film image entering unit 1 for reading photographic images from a film and saving them in a memory, an image data processing unit 2 for subjecting each color image data received from the film image entering unit 1 to desired data processing, etc., an image exposure unit 3 equipped with an exposure head for exposing a photographic printing paper to a light of the processed image data, a developing processing unit 4 for subjecting the exposed printing paper to developing processing, a paper discharging unit 5 for separating the developed printing paper into frames and discharging the frames, and a system control unit 6 for totally controlling the actions of the functional units.

The film image entering unit 1 includes a film conveying unit 11 for transferring each frame of a 135 developed color negative film 10, to the readout station along a sub scanning direction and an image reading unit 12 for reading images of each frame of the film 10 in a main scanning direction oriented at a right to the sub scanning direction.

The film conveying unit 11 includes a winding roller 101, a film conveying motor 102 for driving and rotating the winding roller 101, and a film conveyance control unit 103 for controlling the action of the film conveying motor 102. The image reading unit 12 includes a light source 104 dispose beneath the film 10 to be read, a light source control unit 105 for controlling the light-emitting intensity of the light source 104, an image pickup device 108 composed of a linear CCD array, a reading control unit 109 for controllably driving the image pickup device 108 to read each line of the film data in an optical form generated by the light source 104, a lens unit 107 for focusing each frame-images of the film 10 on the photosensitive surface of the image pickup device 108, an optical filter 106 disposed between the film 10 and the lens unit 107 for dividing the frame-image of the film 10 into three, R, G, and B, primary colors, a filter driving motor 110 for selectively operating the optical filter 106, a filter change-over control unit 120 for controlling the action of the filter driving motor 110, and an image data storage unit 121 for saving the image as a digital data produced by the image pickup device 108.

The image data storage unit 121 includes an A/D converter 122 that converts relevant analog image signals of RGB read by the image pickup device 108 into RGB digital image data in a 12-bit gradation level, respectively, and image buffer memory 123 that includes RAM which stores RGB three-color digital image data converted by the A/D converter 122 in units of frames, and others.

The image data processing unit 2 includes table memory 20 that stored table data, etc. used when various correction processing such as color correction and gradation correction, etc. later discussed and the specified processing such as layout processing, etc. are executed for the image data stored in the image buffer memory 123, image data conversion processing unit 21 equipped with an image processing CPU that reads the image data stored in the image buffer memory 123 and executes color correction processing, gradation correction processing, data conversion processing such as magnification conversion processing, etc., image processing memory 22 in which the image data used and converted for conversion processing of image data by the image data conversion processing unit 21 is stored in an area divided according to RGB colors as final image as final image data in the units of frames, line buffer memory 23 that temporarily stores image data of one line of the final image data, and others.

The image exposing unit 3 includes a photographic conveyance unit 32 provided with a photographic printing paper conveyance control unit 38 that conveys a long sheet form photographic printing paper 31 wrapped around a roll cassette 30 towards an exposure station 33 by a conveying motor 37, an exposure head 34 of a PLZT system that exposes and scans the photographic printing paper 31 conveyed to the exposure station 33, an exposure head control unit 35 that drives and controls the exposure head 34, and an exposure control unit 36 that outputs image data from the line buffer memory 23 to the exposure head control unit 35 at a specified timing synchronized with the conveying speed of the photographic printing paper 31.

The developing processing unit 4 includes a processing tank 40 filled with developing processing liquid, such as developing solution, etc., and a conveyance control unit that conveys the exposed roll photographic printing paper 31 to the processing tank 40 and conveys the roll photographic printing paper 31 that has undergone each processing of developing, bleaching, and fixing to the paper delivery unit 5, and the paper delivery unit 5 includes a cutter 50 that cuts the roll photographic printing paper 31 which underwent developing processing at the developing processing unit 4 in the width direction and divides in the units of one frame and a paper delivery control unit 52 that drives and controls a cutting motor 51 that drives the cutter 50 and discharges and controls the cut photographic printing paper 31 to the outside of the device.

The system control unit 6 includes control CPU, ROM in which the control program is stored, RAM for data processing, and control signal I/O circuit for each functional blocks, and each functional block is integrated and controlled by the control program.

The system control unit 6 is arranged to switch between two different modes for controlling the reading action: a pre-scan mode for driving the film image entering unit 1 to read the full image of each film including transparent section (a film base) at a low resolution and a high speed and a main-scan mode for driving the film image entering unit 1 to read only frames of the image of the each film identified in the pre-scan mode at a high resolution. The system control unit 6 also drives the data conversion processing unit 21 in the image data processing unit 2 to conduct an action of processing the image data scanned in the main-scan mode and then directs the printing paper conveyance control unit 38 to feed the printing paper 31 up to the exposure station 33 and the exposure control unit 36 to print a corrected printing data received from the image data processing unit 2 with the exposure head 34 under its control.

In the pre-scan mode, the image data processing unit 2 is driven by the system control unit 6 for identifying the position of each frame-image and measuring the base concentration value of the film 10 from the scanned image data before adding the pixel value with a difference between the measurement of the detected base concentration and its reference level (which is equal between the RGB color components) to shift the pixel value to a modified value based on the base concentration which is then displayed on the monitor not shown.

The frame-image displayed on the monitor is viewed by an operator, and the operator in turn enters a command for conducting an action of color correction or concentration correction processing (which will be referred to as a film discriminating process hereinafter). The corrected data is then saved in the table memory 20 for future use to correct the image data at high resolution produced in the main-scan mode.

Figure 2:
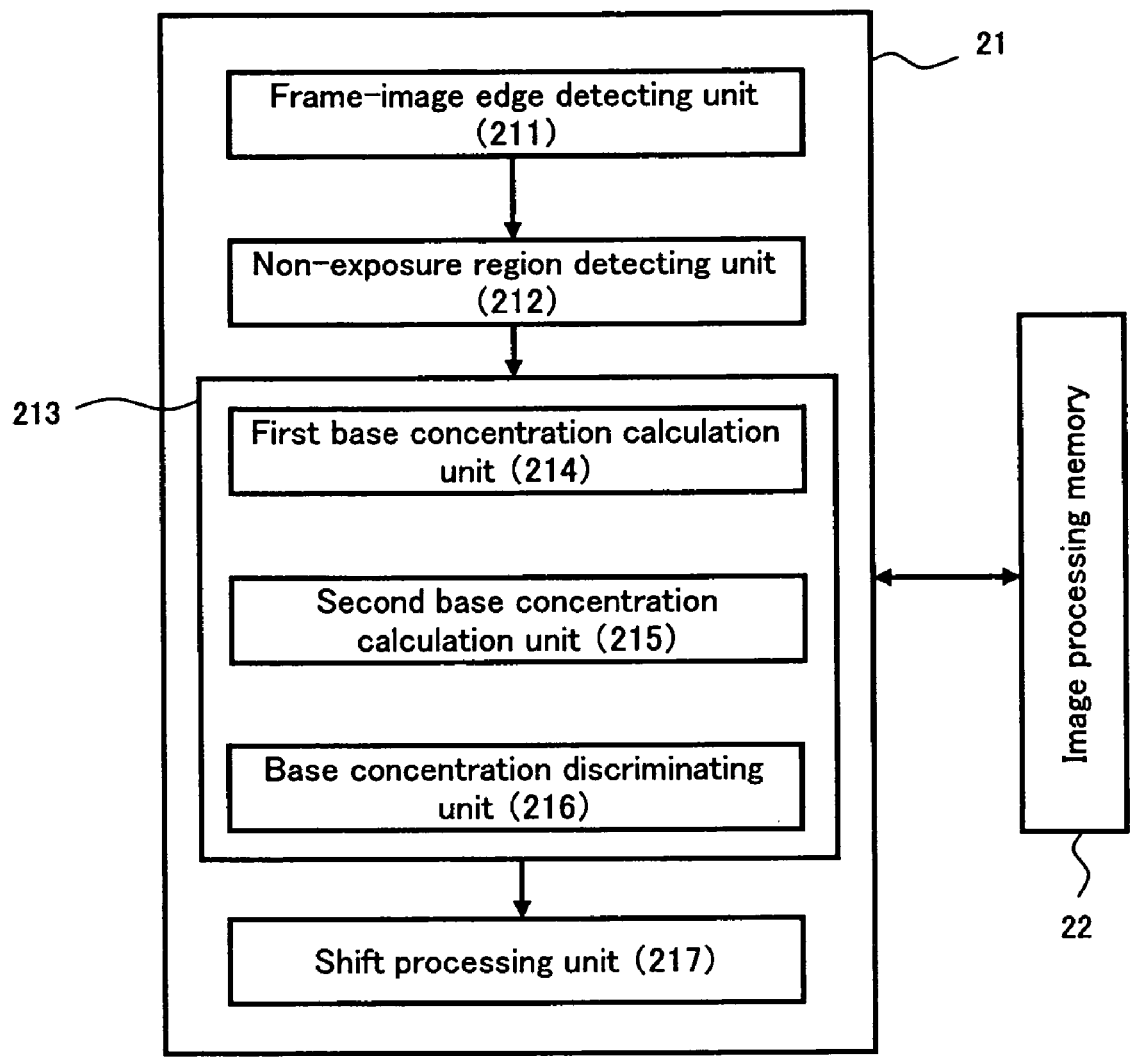
FIG. 2 is a functional block diagram of a base concentration detecting unit.

The method of detecting the base concentration of a film according to the present invention which is carried out by the image data processing unit 2 will now be explained in detail. As shown in FIG. 2, the image data processing unit 2 includes a frame-image edge detecting unit 211 for determining the position of each frame-image of a film through discriminating the edge of the frame-images in a sequence along the direction of a row of the frames of the film which have been scanned by the pre-scan action of the film image entering unit 1 and saved in the image processing memory 22, a non-exposure region detecting unit 212 for detecting a line of pixels extending along the main scanning direction and located at the intermediate between two adjacent frame-image edges from the edge data determined by the frame-image edge detecting unit 211, a base concentration calculation unit 213 for calculating the base concentration value of the film through subjecting the pixel values in the non-exposure region determined by the non-exposure region detecting unit 212 to a statistic calculation, and a shift processing unit 217 for shifting the pixel values to modified values based on the detected base concentration value.

The base concentration detecting unit 213 includes a first base concentration calculation unit 214 for subjecting the pixel values in the non-exposure region to a first arithmetic operation to calculate a first base concentration, a second base concentration calculation unit 215 for subjecting the pixel values in the non-exposure region to a second arithmetic operation, which is different from the first arithmetic operation, to calculate a second base concentration, and a base concentration discriminating unit 216 for discriminating the two, first and second, concentrations to judge that higher one of the two levels is the true base concentration.

As two or more of the base concentration value are calculated by different arithmetic operations along each line of pixels (the total number of lines being determined by the number of frames minus one in each film) in the non-exposure region determined by the action of the non-exposure region detecting unit at the intermediate area between two adjacent frame-image edges, their highest is determined as the true base concentration. This allows the base concentration to be more accurate than that calculated by a single arithmetic operation.

Figure 3:
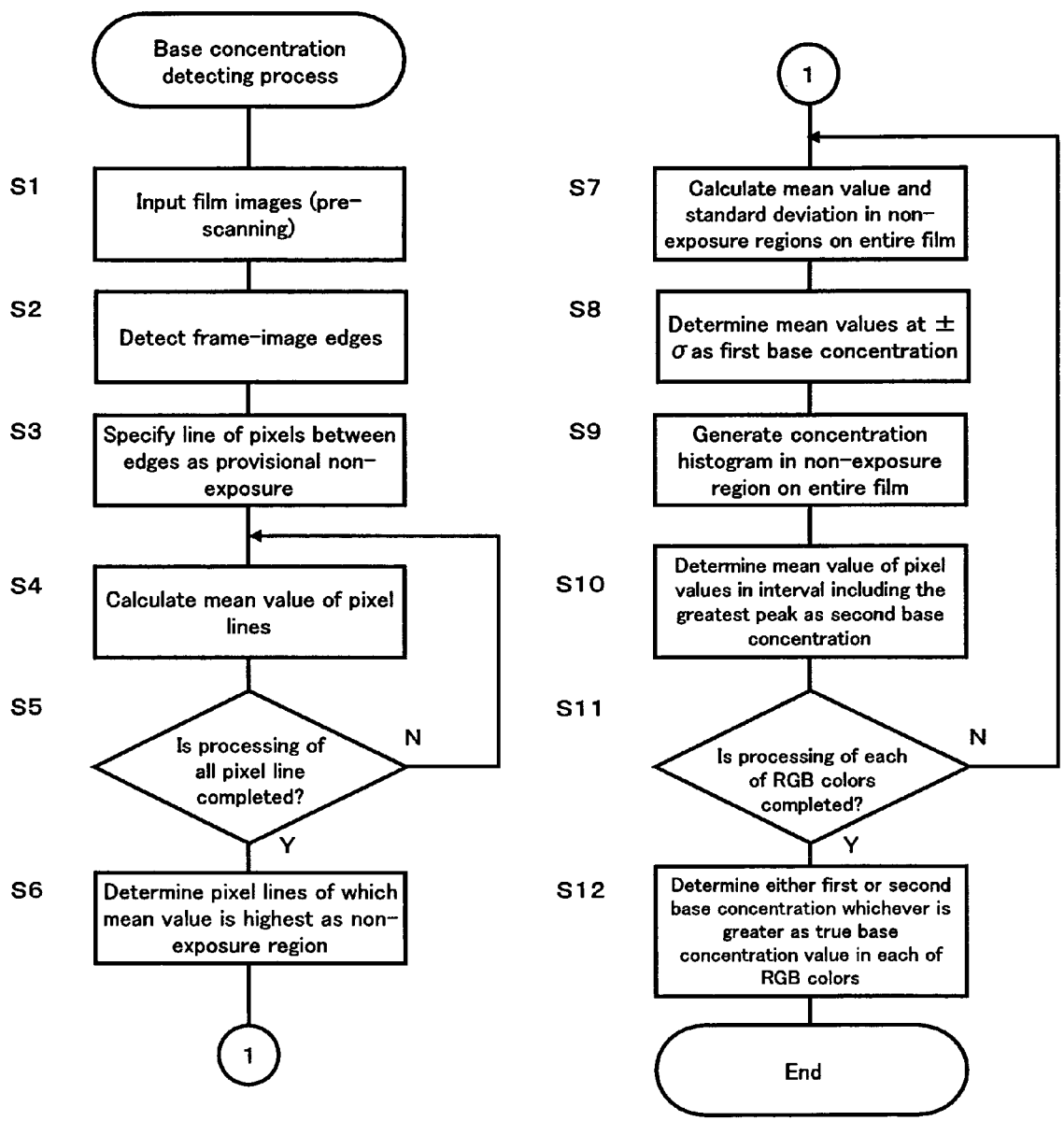
FIG. 3 is a flowchart explaining the method of detecting the base concentration of a film.

Referring to FIG. 3, the method of detecting the base concentration starts with the film image entering unit 1 scanning the images on a film including its base in the prescan mode to develop an image data which is then saved in the image buffer memory 123 (S1) and the frame-image edge detecting unit 211 detecting the edge of each frame along the sub scanning direction in each color or a mean value of the RGB color components to define the frame-image areas (S2).

Figure 7A:
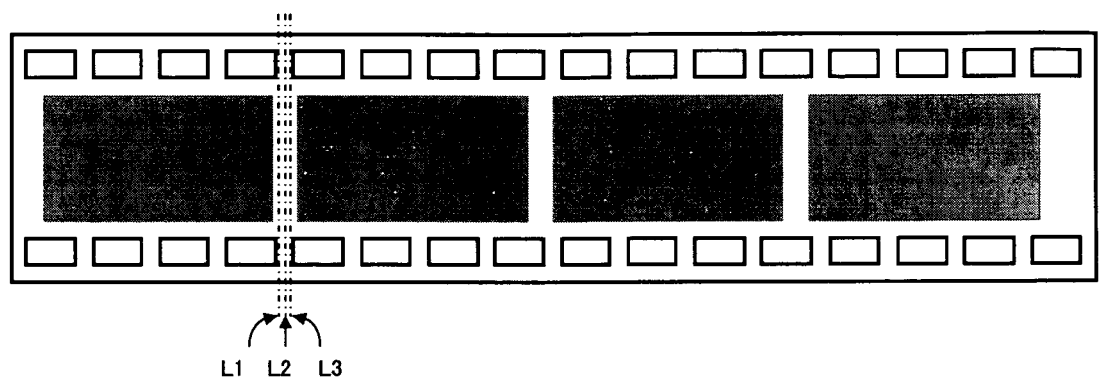
FIG. 7A is an explanatory view for specifying the non-exposure region (a line of pixels) between frame-images.

Then as shown in FIG. 7A, the non-exposure region detecting unit 212 specifies as the provisional non-exposure region a line of pixels L1 extending along the main scanning direction and spaced by a given number of pixels in the sub scanning direction from the right edge of each frame-image (S3). The distance between any two normal adjacent frames (a frame-image distance) is substantially 2 mm as equivalent to the width of some pixels along the sub scanning direction. Any desired line of pixels (L1, L2, or L3 in FIG. 7A) is specified as the non-exposure region. For simplicity, the line of pixels at the center of the frame distance may be specified as the non-exposure region.

Figure 6A:
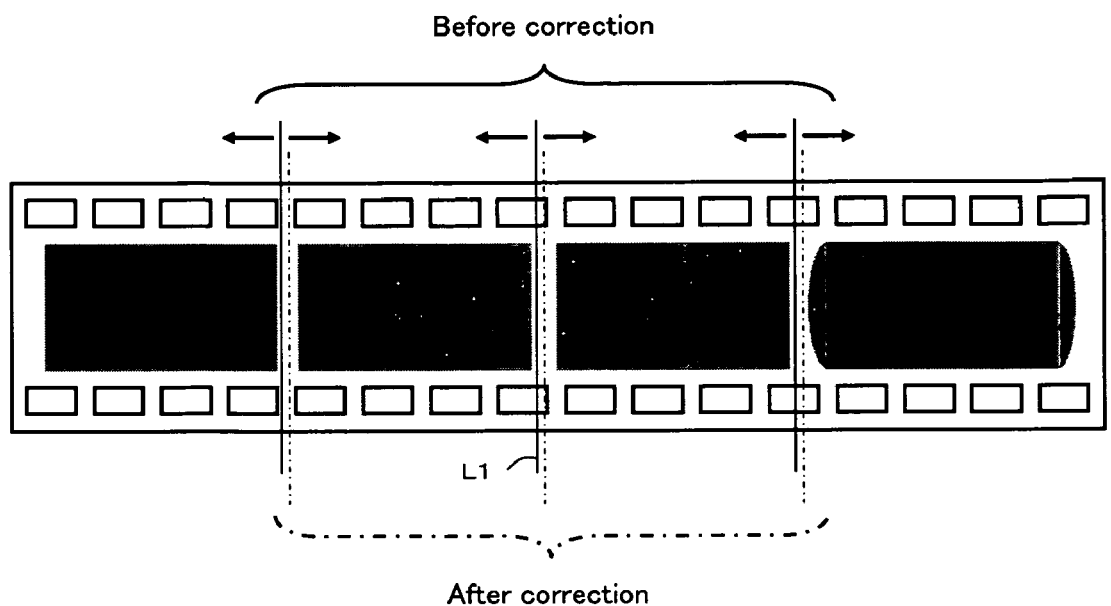
FIG. 6A is an explanatory view for specifying the non-exposure region between frame-images.
Figure 6B:
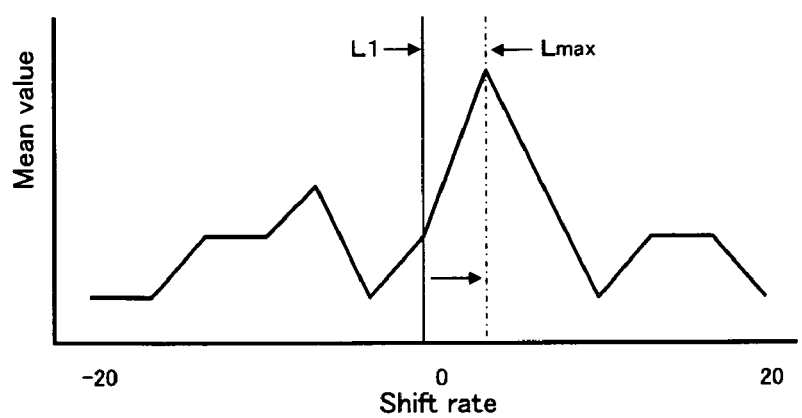
FIG. 6B is a profile explaining a process for specifying the non-exposure region between frame-images.

The pixels of the lines in all the provisional non-exposure regions between the frame-images on one film are then calculated for determining a mean level of the pixels in each of the RGB color components (S4). The calculating may be applied to all or a desired number of the pixel lines between the frame-images. In this embodiment, the pixels in the area defined by the pixel line L1 of the provisional non-exposure region plus and minus 20 lines as shown in FIG. 6A are calculated (S5). The pixel line Lmax having the highest of the mean pixel value or the highest in the brightness is then specified as the final non-exposure region as shown in FIG. 6B (S6).

Figure 4A:
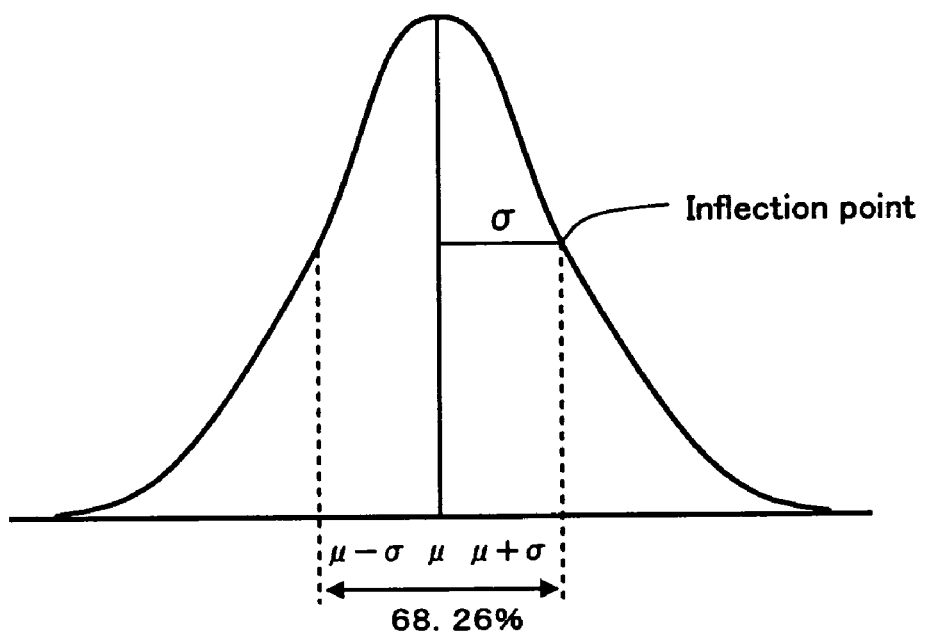
FIG. 4A is a profile explaining a process for calculating a first base gray-level.

This is followed by the first base concentration calculation unit 214 calculating the mean pixel value $\mu$ and its standard deviation $\sigma$ in each of the RGB color components in all the pixel lines specified as the non-exposure regions (S7). Then as shown in FIG. 4A, the pixels within the range $\pm\sigma$ about the mean value μ of the pixel values are selected from all the pixels in the pixel lines of the non-exposure regions and their mean value is calculated as the first base concentration in each of the RGB color components (S8).

Since the mean pixel value μ and its standard deviation σ in each of the RGB color components in the pixel lines at the intermediate between any two adjacent frame-image edges are firstly calculated and the further mean pixel value within the range ±σ about the mean value μ (about 68 percent of the pixels in the non-exposure regions) is secondly calculated, any extraordinary pixels deviated from the mean value μ, such as in over-scene pictures where the concentration is overlapped or in a brighter spot exposed through a perforation, can be removed thus to improve the accuracy in the base concentration in each of the RGB color components.

Figure 5A:
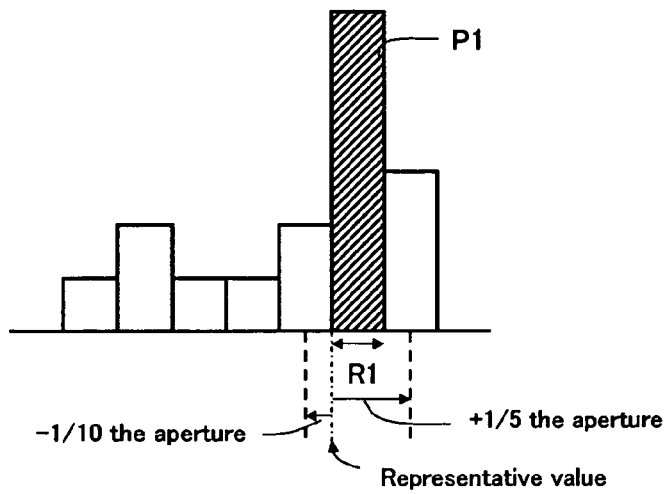
FIG. 5A is a profile explaining a process for calculating a second base gray-level.

Similarly, the second base concentration calculation unit 215 operates to produce, as shown in FIG. 5A, a concentration histogram in each of the RGB color components in all the pixel lines specified as the non-exposure regions by the non-exposure region detecting unit 212 (S9). Then, the pixels within a specified range of the gradation value including interval R1 showing the greatest peak P1 are selected from all the pixels in the pixel lines of the non-exposure regions and their mean value is calculated as the second base concentration in each of the RGB color components (S10).

The gradation value of the pixels read out by the film image entering unit 1 are expressed in a 12-bit scale ranging from 0 to 4095. The concentration histogram is provided at equal intervals of ¼ to ⅛ the aperture size thus showing 50 to 100 different levels. Assuming that the minimum is specified as a representative level in each interval, the range extends from −1/10 to ⅕ the aperture size about the representative level in the peak interval R1. The range determined in this embodiment is preferable illustration, but not to be considered limited to what is described in the specification.

As the steps S7 to S10 have been carried out in each of the RGB color components (S11), the comparison between the first base concentration and the second base concentration follows to determine that higher one of the two levels is the true base concentration (S12). The pixel values are shifted by the shift processing unit 217 to modified values based on the base concentration value. Using the modified pixel values, the color correction, the concentration correction processing, and any other applicable process can be carried out. The pixel value at high resolution produced by the main scanning action can thus be shifted to a modified value based on the base concentration.

As set forth above, the method of detecting the base concentration of a film according to the present invention includes a film image entering process of reading a developed film with an image pickup device to generate the pixel values in each of the RGB color components, a non-exposure region detecting step of detecting the edge of each frame on the film from the pixel values generated in the film image entering process and specifying as the non-exposure region each line of pixels disposed at the intermediate between any two adjacent frame-image edges from the edge data, and a base concentration calculating step of subjecting the pixel values in each non-exposure region specified in the non-exposure region detecting step to a statistic calculation for calculating the base concentration value of the film, wherein the base concentration calculating step is arranged to subject the pixel values in the non-exposure regions to two or more arithmetic operations for calculating two or more base concentration value and to judge that the highest of the base concentration value is a true base concentration value. More particularly, according to the present invention, the R component of the pixel value may be selected as the first base concentration value while the G and B components are regarded as the second base concentration value. As the result, the brightest of the concentration value in each color can be detected.

Another embodiment of the film base concentration detecting method according to the present invention will now be described. The preceding embodiment allows the first base concentration calculation unit 214 to calculate the mean pixel value μ and its standard deviation σ in all the pixel lines specified as the non-exposure regions. This is followed by selecting the pixels within the range ±σ about the mean value μ of the pixel values from all the pixels in the pixel lines of the non-exposure regions and calculating their mean value as the first base concentration in each of the RGB color component. The mean value needs not to be calculated from the pixels in all the pixel lines of the non-exposure regions but may be from a less number of the pixels reduced from the total number for increasing the speed of the arithmetic operation.

Figure 4B:
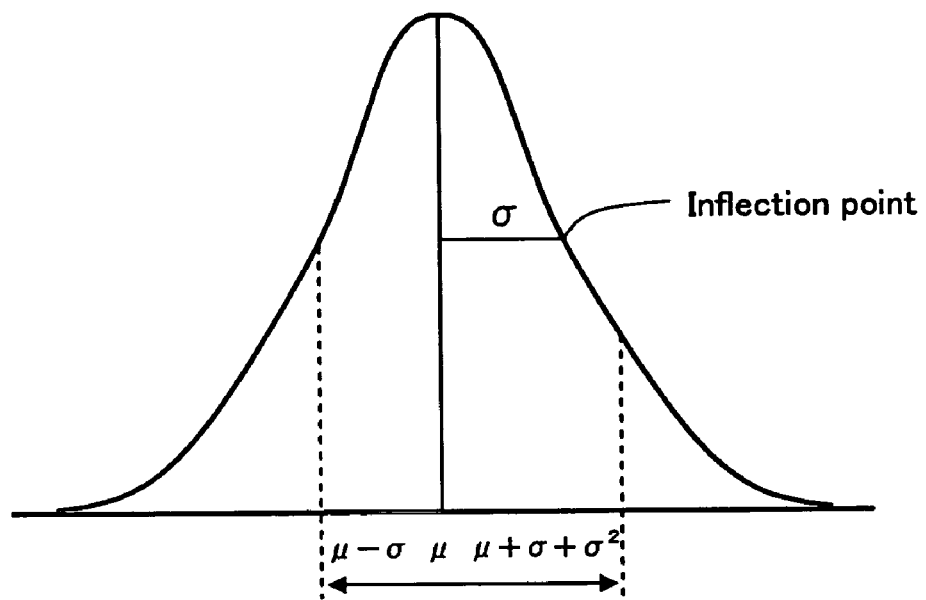
FIG. 4B is a profile explaining a process for calculating a first base gray-level.

It may also be a good idea as shown in FIG. 4B that the mean pixel value μ and its standard deviation σ in all the pixel lines specified as the non-exposure regions are first calculated and then the pixels within a range from −σ to σ+σ² about the mean value μ of the pixel values are selected from all the pixels in the pixel lines of the non-exposure regions before their mean value of selected pixel is calculated as the first base concentration. In this case, the range is favorably extended further towards the brighter size of the pixels to be examined for calculating the base concentration. The reason why the upper limit of the range is σ+σ² is for increasing the pixels at the brighter end while discarding the pixel values exposed through the perforations provided at both the upper and lower sides of the film. So long as the pixel values exposed through the perforations are not involved, the range is not limited to the two limits.

When the concentration histogram in each of the RGB color components is generated from the pixel data of the pixel lines at the intermediate between any two adjacent frame-image edges, its peak represents the base concentration. This allows the mean value to be calculated from a narrower range where the greatest peak is present. Accordingly, the extraordinary pixel data such as in over-scene pictures where the concentration is overlapped or in a brighter spot exposed through a perforation can be removed thus to improve the accuracy in the base concentration in each of the RGB color components.

Figure 7B:
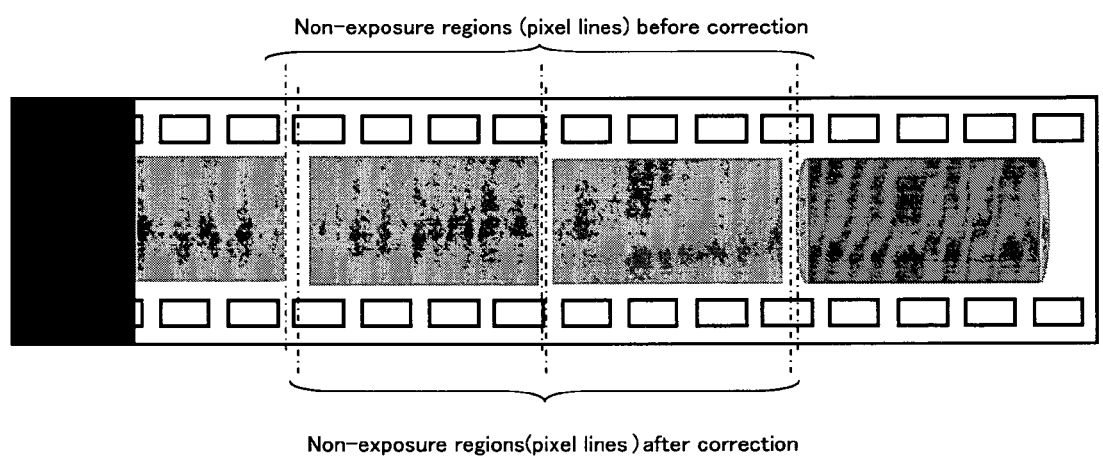
FIG. 7B is an explanatory view for specifying the non-exposure region (a line of pixels) between frame-images.
Figure 8A:
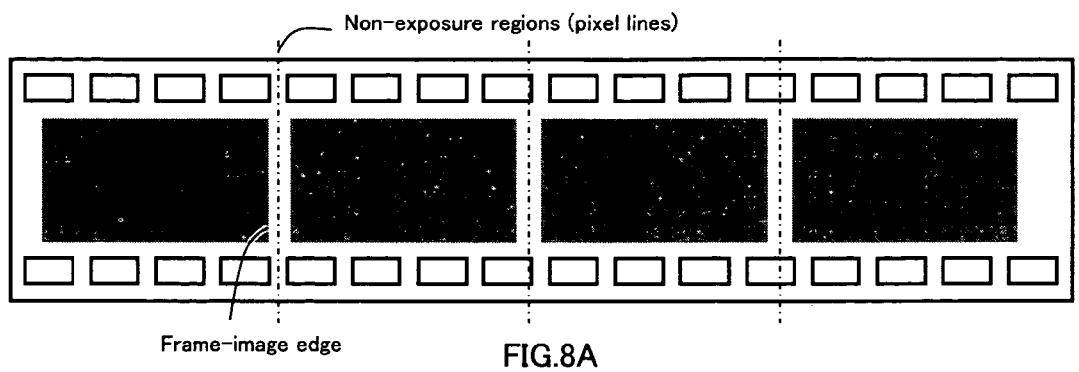
FIG. 8A is an explanatory view showing proper and improper conditions between frame-images.
Figure 8B:
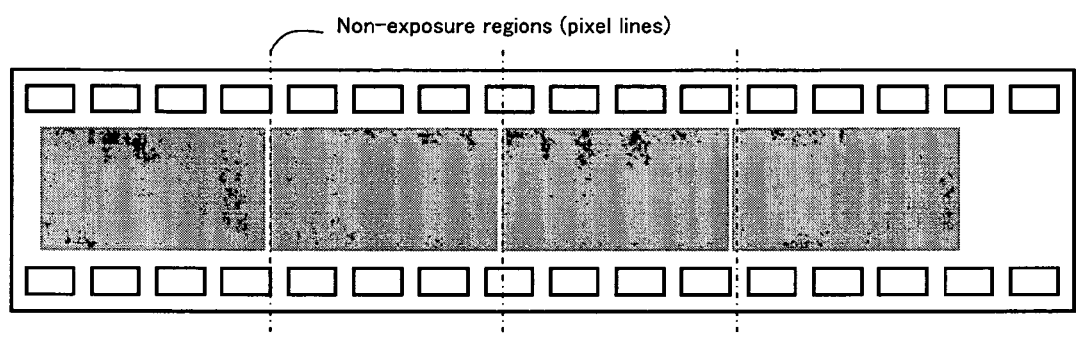
FIG. 8B is an explanatory view showing proper and improper conditions between frame-images.
Figure 8C:
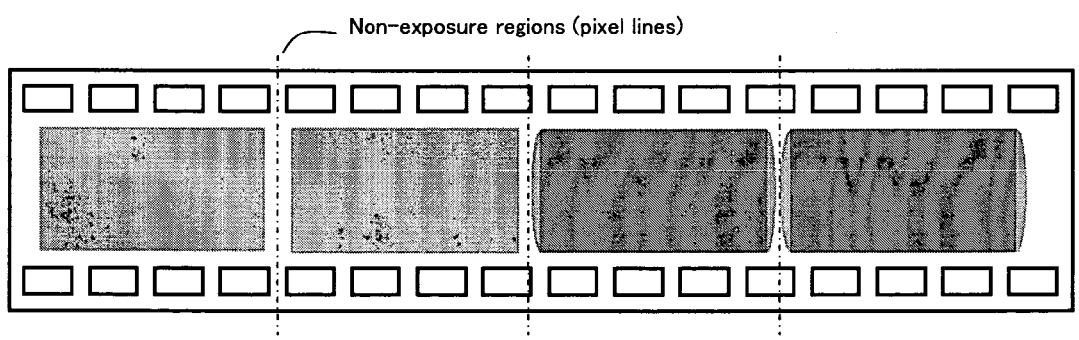
FIG. 8C is an explanatory view showing proper and improper conditions between frame-images.

Moreover, after the non-exposure region detecting unit 212 specifies as the provisional non-exposure region a particular line of pixels L1 which extends along the main scanning direction and is spaced by a given number of pixels in the sub scanning direction from the right edge of each frame-image (preferably, which are located at the intermediate between any two adjacent frames), a determining (or correction) process may be conducted for, when one of the pixel lines L1 is shifted to ±20 along the sub scanning direction, determining as the non-exposure region the line of pixels L1 of which the mean value concentration is the highest. This is follows by calculating the mean pixel value μ and its standard deviation σ in all the pixel lines specified as the non-exposure regions, selecting the pixels within a range ±σ or a range from −σ to σ+σ² about the mean value μ of the pixel values, and then calculating their mean value as the first base concentration in each of the RGB color components. In this embodiment, even if some frames are dislocated due to the intrinsic characteristics of a camera employed or the overlapping at the leading end of a film, the location can precisely be identified as shown in FIG. 7B.

Since the range of the pixel values for calculating the mean value is increased to $\sigma+\sigma^2$ at the higher end, the pixel values at the brighter side can be involved.

Figure 5B:
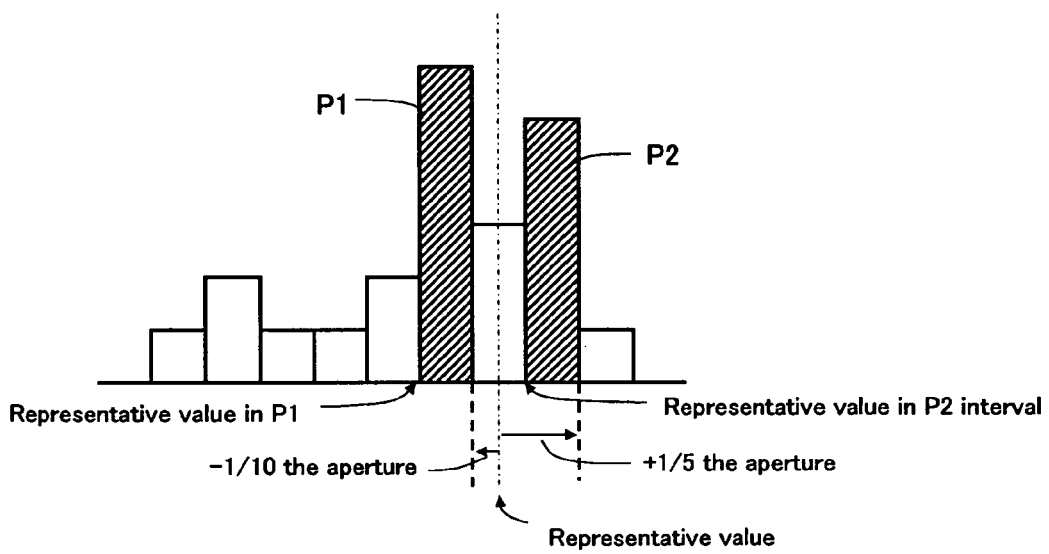
FIG. 5B is a profile explaining a process for calculating a second base gray-level.

The preceding embodiment includes allowing the second base concentration calculation unit 215 to generate a concentration histogram in each of the RGB color components in all the pixel lines specified as the non-exposure regions, selecting the pixels within a specified range of the gradation value including the greatest peak from all the pixels in the pixel lines of the non-exposure regions, and then calculating their mean value as the second base concentration. Alternatively, as shown in FIG. 5B, when a image data processing unit 2 of the concentrations in each of the RGB color components in all the pixel lines specified as the non-exposure regions has been generated, the pixels within a specified range of the gradation value which is determined by a combination of the greatest peak P1 and the second peak P2 found at a higher range than the greatest peak P1 are selected and their mean value may be calculated as the second base concentration value. In the latter case, the addition of the second peak P2 can compensate for a range not covered by the greatest peak P1.

As the range of the pixel values for calculating the mean value is increased towards the higher end with the help of the second peak P2 found at a higher range than the greatest peak P1, the mean value can remain not overshot even when the greatest peak P1 hardly represents the base concentration.

Meanwhile, the gradation value of the pixels read out by the film image entering unit 1 are expressed in a 12-bit scale ranging from 0 to 4095. The concentration histogram is provided at equal intervals of ¼ to ⅛ the aperture size thus showing 50 to 100 different levels. Assuming that the minimum is specified as a representative level in each interval, the range extends from −1/10 to ⅕ the aperture size about a final representative level which is calculated from a ratio between the representative levels in the two peak intervals including the greatest peak and the second peak respectively. The final representative level is a mean value in the ratio between the two peaks. Preferably, the final representative level may be equal to the representative level with the greatest peak when the second peak is smaller than 40% of the greatest peak or the representative level with the second peak when the second peak is greater than 80% of the greatest peak. When the second peak is 40% to 80% of the greatest peak, the final representative level is calculated from the ratio.

Figure 5C:
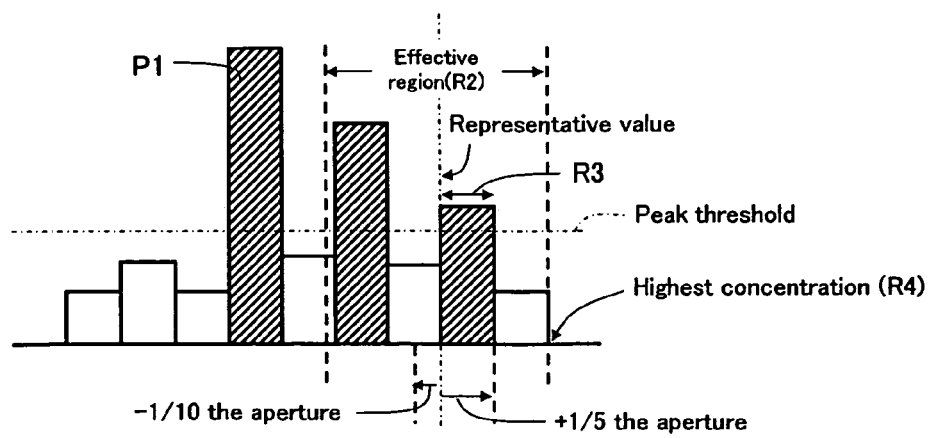
FIG. 5C is a profile explaining a process for calculating a second base gray-level.

Also, the preceding embodiment includes allowing the second base concentration calculation unit 215 to generate a concentration histogram in each of the RGB color components in all the pixel lines specified as the non-exposure regions, selecting the pixels within a specified range of the gradation value including the greatest peak from all the pixels in the pixel lines of the non-exposure regions, and then calculating their mean value as the second base concentration. An alternative procedure may be provided as shown in FIG. 5C. When a concentration histogram in each of the RGB color components in all the pixel lines specified as the non-exposure regions has been generated, a range extending from the highest concentration at the point P4 (of the brightest) to a lower (darker) side (preferably consisting of two to four intervals) is set as the effective region R2 for calculating the base concentration. This is followed by determining the brightest interval R3 which is located at the higher (brighter) side than the interval of the greatest peak P1 in the concentration histogram and also includes a desired number of pixels (preferably ½ the number of pixels in each pixel line) greater than those in the effective region. Assuming that the minimum in the interval R3 is a representative level, the mean value is calculated from the pixel values in a range from −1/10 to ⅕ the aperture about the representative level. If there is no interval which includes a desired number of pixels (preferably ½ the number of pixels in each pixel line) greater than those in the effective region, the highest of the gradation value assigned to the film is then used as the base concentration value.

Since a combination of the arithmetic operation steps are involved for calculating the base concentration, the method of calculating the base concentration of a film is carried out excluding the extraordinary pixels such as in over-scene pictures where the concentration is overlapped or in a brighter spot exposed through a perforation, which may generate noises. Accordingly, the base concentration calculated can be improved in the accuracy and the utility.

It would also be understood that the steps of the base concentration calculation units 214 and 215 for calculating the base concentration are implemented by the second procedure using the mean value deviation or the third procedure using the concentration histogram or any other applicable arithmetic calculations.

In the previous embodiment, the non-exposure region detecting step prior to the base concentration calculating step is arranged to specify a line of pixels as the provisional non-exposure region, calculate the mean pixel value in the provisional non-exposure region, and determine the line of pixels of which the mean value is the highest as the final non-exposure region of interest. The action is not limited to the above described step but may be a process for simply determining as the non-exposure region a line of pixels which is displaced by a given number of pixels in the sub scanning direction from the edge of the corresponding frame-image.

For calculating the base concentration of a film from the pixel data in a non-exposure region between the frame-images on the film, a particular line of pixels of which the mean pixel value is the highest is selected from the lines of pixels, each located at the intermediate between any two adjacent frame-image edges, and specified as the non-exposure region. As the result, the base concentration which has been calculated will be improved in the accuracy.

The present invention should not be limited to the above-mentioned embodiments but changes and variations and combinations may be made properly within the purview of characteristic configurations set forth in the SUMMARY OF THE INVENTION as far as the similar working effects are obtained.

What is claimed is:

1. A method of detecting a base concentration of a film comprising:

a film image entering process of reading a developed film with an image pickup device to generate pixel values in each of RGB color components;

a non-exposure region detecting step of detecting an edge of each frame-image on the developed film from the pixel values generated in the film image entering process and specifying as a non-exposure region each line of pixels disposed at an intermediate between any two adjacent frame-image edges from the detected edge data; and a base concentration calculating step of subjecting the pixel values in each non-exposure region specified in the non-exposure region detecting step based on two or more arithmetic operations for calculating two or more base concentration values and judging a highest of the two or more base concentration values as a true base concentration value, a shift processing step of shifting the pixel values of each frame-image on the developed film to modified pixel values based on a base concentration value judged as the true base concentration value in the base concentration calculating step, a displaying step of displaying the frame-image on the developed film of whose pixel values are modified in the shift processing step on a monitor.

2. The method of detecting a base concentration of a film according to claim 1, wherein the two or more arithmetic operations are conducted by:

calculating a mean pixel value in the non-exposure region and a standard deviation σ of the mean pixel value in each of the RGB color components; and determining the mean pixel value within a range ±σ about the mean pixel value as the base concentration value in each of the RGB color components.

3. The method of detecting a base concentration of a film according to claim 1, wherein the two or more arithmetic operations are conducted by:

generating a concentration histogram in each of the RGB color components from the pixel values in the non-exposure region; and determining a mean pixel value in an interval which includes a greatest peak as the base concentration value of the film.

4. The method of detecting a base concentration of a film according to claim 1, wherein the two or more arithmetic operations are conducted by:

calculating a mean pixel value in the non-exposure region and a standard deviation σ of the mean pixel value in each of the RGB color components; and determining the mean pixel value within a range from −σ to σ+σ² about the mean pixel value as the base concentration value in each of the RGB color components.

5. The method of detecting a base concentration of a film according to claim 1, wherein the two or more arithmetic operations are conducted by:

generating a concentration histogram in each of the RGB color components from the pixel values in the non-exposure region; and determining a mean pixel value in an interval, which is determined by a relationship between a greatest peak and a second peak found at a higher side of the greatest peak, as the base concentration value of the film.

6. The method of detecting a base concentration of a film according to claim 1, wherein the two or more arithmetic operations are conducted by:

calculating a mean pixel value in the non-exposure region and a standard deviation σ of the mean pixel value in each of the RGB color components;

determining a mean pixel value within a range ±σ about the mean pixel value as one base concentration in each of the RGB color components;

generating a concentration histogram in each of the RGB color components from the pixel values in the non-exposure region; and determining the mean pixel value in an interval which includes a greatest peak as another base concentration value of the film.

7. The method of detecting a base concentration of a film according to claim 1, wherein the two or more arithmetic operations are conducted by:

calculating a mean pixel value in the non-exposure region and a standard deviation σ of the mean pixel value in each of the RGB color components;

determining a mean pixel value within a range ±σ about the mean pixel value as one base concentration in each of the RGB color components;

generating a concentration histogram in each of the RGB color components from the pixel values in the non-exposure region; and determining the mean pixel value in an interval, which is determined by a relationship between a greatest peak and a second peak found at a higher side of the greatest peak, as another base concentration value of the film.

8. The method of detecting a base concentration of a film according to claim 1, wherein the two or more arithmetic operations are conducted by:

calculating a mean pixel value in the non-exposure region and a standard deviation σ of the mean pixel value in each of the RGB color components;

determining the mean pixel value within a range from −σ to σ+σ² about the mean pixel value as one base concentration in each of the RGB color components;

generating a concentration histogram in each of the RGB color components from the pixel values in the non-exposure region; and determining the mean pixel value in an interval which includes a greatest peak as another base concentration value of the film.

9. The method of detecting a base concentration of a film according to claim 1, wherein the two or more arithmetic operations are conducted by:

calculating a mean pixel value in the non-exposure region and a standard deviation σ of the mean pixel value in each of the RGB color components;

determining the mean pixel value within a range from −σ to σ+σ² about the mean pixel value as one base concentration value in each of the RGB color components;

generating a concentration histogram in each of the RGB color components from the pixel values in the non-exposure region; and determining the mean pixel value in an interval, which is determined by a relationship between a greatest peak and a second peak found at a higher side of the greatest peak, as another base concentration value of the film.

10. The method of detecting a base concentration of a film according to claim 1, wherein the non-exposure region detecting step is conducted by:

detecting the edge of each frame-image on the film from the pixel values read out in the film image entering process;

specifying as a provisional non-exposure region a line of pixels located at the intermediate between any two adjacent frame-image edges and calculating a mean pixel value in a provisional non-exposure region;

repeating the process of calculating the mean pixel value in each line of pixels while the line of pixels to be examined is shifted by a given distance forward or backward from an original location of the line of pixels; and determining the line of pixels of which the mean value is a highest as a true non-exposure region.

* * * * *